June 25, 1968 — E. R. HIRT — 3,389,654
ARTICLE-LIFTING AND STAMPING APPARATUS
Filed Jan. 25, 1967
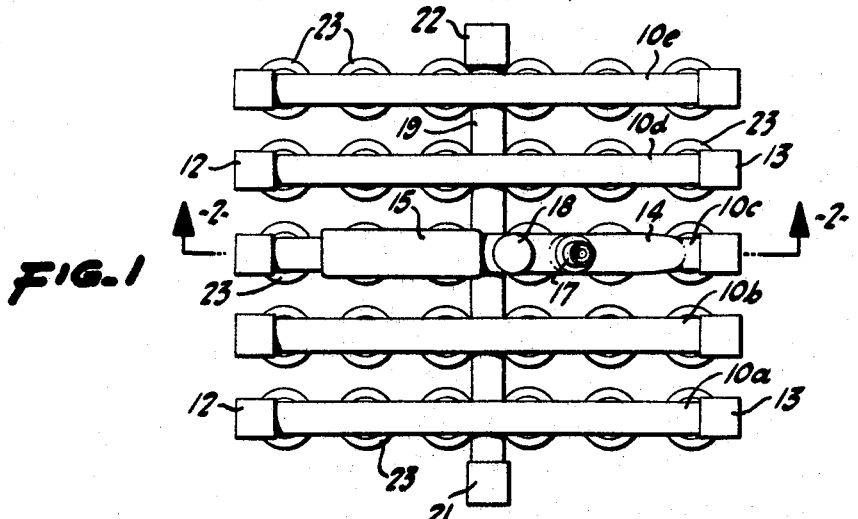
FIG. 1
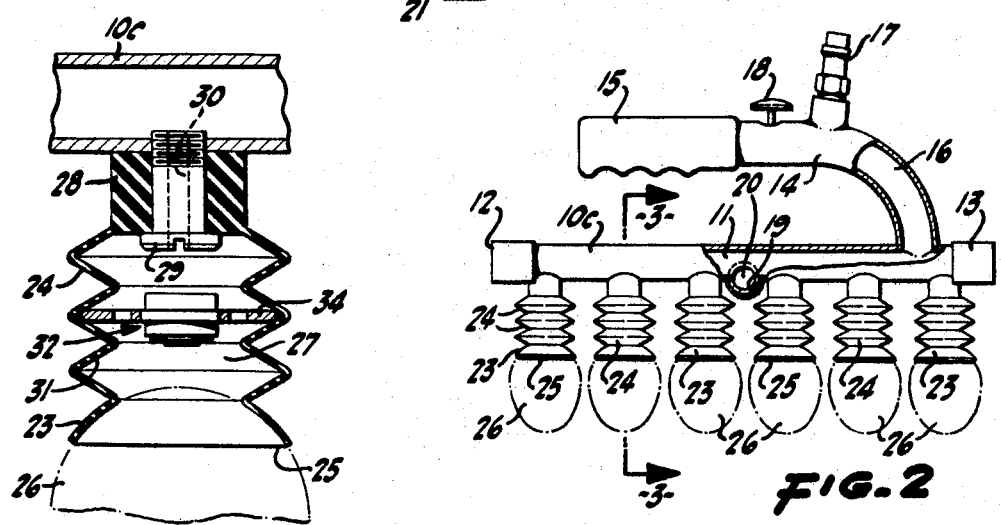
FIG. 2
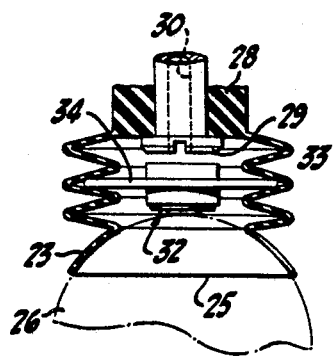
FIG. 3
FIG. 4
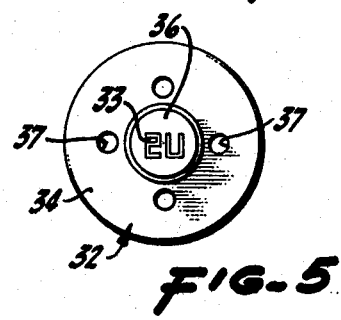
FIG. 5
INVENTOR
EDWIN R. HIRT
BY Stanley Bialos
ATTORNEY United States Patent Office 3,389,654
Patented June 25, 1968

3,389,654
ARTICLE-LIFTING AND STAMPING APPARATUS
Edwin R. Hirt, Orinda, Calif., assignor to Food Systems, Inc., Berkeley, Calif., a corporation of California
Filed Jan. 25, 1967, Ser. No. 611,640
11 Claims. (Cl. 101—35)

ABSTRACT OF THE DISCLOSURE

A device for engaging individual shell eggs to apply an identifying stamp or legend thereto and to grip the egg so that it can be lifted from a support therefor and moved from one location to another. The device includes a handle-equipped tube structure forming a manifold for connection to a vacuum source, and which tube structure has one or more resilient and compressible egg-engageable vacuum cups carried thereby and in flow communication with the manifold. A stamping component is located within each vacuum cup, and when a cup is brought into engagement with an egg, the vacuum developed within the cup causes the egg to be clamped thereto and the cup to be compressed to the extent that the egg is brought into legend-receiving engagement with the stamping component within the cup. The device can then be moved to cause the egg to be deposited at a different location upon termination of the reduced vacuumizing pressure within the cup.

---

This invention relates to article-lifting and stamping apparatus and, more particularly, to a hand-manipulatable vacuum-lifting and stamping device specially useful in connection with relatively lightweight articles, such as eggs.

Considering eggs as an exemplification of articles with which the apparatus has utility, they are ordinarily transported in bulk form in relatively large crates containing multiple flats or layers of eggs separated from those above and below by dividers. Each such layer comprises a plurality of eggs arranged in longitudinally extending and transversely extending rows, and the dividers are used to separate the eggs from each other and to maintain the orientation thereof. The eggs are necessarily removed from such crates for inspection, grading, repackaging, etc., and until quite recently, removal and other processing of the eggs has been a manual operation in which skilled workmen may be able to grip several eggs at one time between the various digits of the hand and then remove such eggs from the crate. Even so, there is a sharp limitation on the number of eggs that can be manipulated at any one time by even a very skilled workman.

The requirement for stamping eggs or otherwise providing indicia thereon for identification and classification purposes is becoming quite prevalent. For example, many foreign countries, and especially the European countries, now require substantially all eggs to be stamped with identifying indicia; and in a great number of countries, eggs that are to be used for growing cultures or for other medical purposes must be so identified. Within the United States, eggs purchased by the military are required to be provided with grading information thereon. Although egg grading machinery now being manufactured is often equipped with automatic egg stamping mechanism, especially in Europe, to a great extent the present practice is to provide eggs with an identifying indicia when required by marking the eggs individually in a hand-stamping operation. Quite evidently, this is a slow and tedious operation and, as a consequence thereof, is necessarily expensive.

Within recent years lifting devices have been devised which enable a substantial number of eggs to be gripped simultaneously so as to facilitate repositioning thereof at a different location in either the same or in an alternate orientation. Such lifters for the most part are characterized by being vacuum-lifting devices equipped with a plurality of hollow resilient cups each provided with a soft annular lip adapted to engage an egg so as to form a sealing relation therewith enabling the egg to be clamped to the cup when a reduced pressure is established within the hollow interior thereof. Such lifting devices overcome the limitation defined by the digits of the hand on the number of eggs that can be processed at any one time, and, therefore, represent a substantial contribution to the art. Examples of such devices are found in the following patents which issued to Edwin R. Hirt: No. 3,139,300, No. 3,230,001, No. 3,061,352, and Design No. 196,607.

Evidently, it would be advantageous to combine into a single step or procedure the operation of stamping each egg with identifying indicia and the operation of gripping and lifting each such egg to reposition the same at a different location. Clearly, such combination would unite into one procedure two operations that heretofore have been separate and unrelated; and in consequence of such unification, considerable savings would be realized in terms of the expenditure of effort, time and cost. In view of this, an object, among others, of the present invention is to provide improved apparatus in which such operations are combined, and a unitary structure provided for effecting the same.

As concerns such improved apparatus, a typical embodiment thereof includes a plurality of hollow resilient cups respectively adapted to be brought into engagement with a plurality of eggs to grip or hold the same upon the establishment of a reduced pressure within the hollow interiors of the cups. Creating a reduced pressure or vacuum within each cup causes the same to compress axially so that the egg carried thereby is displaced into engagement with a stamping device located within the hollow interior of the cup. In that the gross weight of any egg differs little in order of magnitude from the gross weight of all other eggs, the force with which each egg is displaced into engagement with the stamping device upon vacuum-actuated compression of the resilient cup is essentially uniform from egg to egg with the result that a consistantly legible impression of the stamping device is made upon the surface of each egg. Moreover, substantially the same force is applied to each egg of a plurality thereof simultaneously engaged by a multiple-cup lifter, and each such egg is, therefore, legibly marked, it is marked without danger of breakage by the application thereto of a large or impact-type force, and a great number of eggs (e.g., 30 to 48) can be lifted and stamped concurrently in a single operation without excessive manual exertion because the force required to effect engagement between each egg and the stamping device associated therewith is derived from the applied vacuum rather than muscularly.

An embodiment of the invention is illustrated in the accompanying drawing in which:

FIGURE 1 is a top plan view of a multiple-cup vacuum-lifting apparatus embodying the invention;

FIGURE 2 is a longitudinal sectional view taken along the line 2—2 of FIGURE 1;

FIGURE 3 is a vertical-sectional view through one of the cups taken along the line 3—3 of FIGURE 2;

FIGURE 4 is a vertical-sectional view similar to that of FIGURE 3 but showing the cup in the compressed state thereof in which the egg carried thereby is in engagement with the associated stamping device; and FIGURE 5 is a bottom plan view of a stamping device.

The exemplary hand-held vacuum-lifting apparatus shown in the drawing includes a plurality of longitudinally extending carriers or hollow carrier tubes respectively denoted with the numeral 10a through 10e, there being five in number in the apparatus illustrated. Each carrier 10 is provided interiorly with a suction passage 11 extending from end to end thereof. Each suction passage 11 is open ended, and a pair of caps or closures 12 and 13 are used to cover such open ends of the passage so as to permit a reduced pressure or vacuum to be established therein. The closures 12 and 13 are removable and may be in the form of cap structure which slidably and telescopically receive the adjacent end portions of the associated carrier 10 therein.

The carrier 10c is centrally located and is equipped with a handle 14 defining a hand-hold portion therealong which, in the usual case, is equipped with a removable hand grip 15. The handle 14 is in the form of hollow tube having a control passage 16 extending therethrough which at one end is in open communication with the suction passage 11 formed within the carrier 10c. At its other end, the passage 15 is open except for the closure thereof defined by the hand grip 15, or by a separate closure (not shown) located within the hand grip. The handle 14 at one end is fixedly related to the carrier 10c and the interconnection of these two components may be effected by any suitable means, such as welding as indicated in the drawing. The handle 14 angles upwardly from the carrier 10c and curves rearwardly so as to extend therealong in spaced apart substantially parallel relation therewith and, accordingly, the longitudinal axes of the carrier 10c and handle 14 lie in substantially the same plane and the apparatus is essentially symmetric with respect to such plane.

The control passage 16 within the handle 14 is adapted to communicate through a coupling 17 with a vacuum source or source of reduced pressure (not shown). Intermediate the hand grip 15 and coupling 17, the handle 14 is equipped with valve structure 18 operable to control selectively the establishment of a condition of reduced pressure within the control passage 16. The valve structure 18 may take any convenient form, and the structure illustrated is simply a pad spring biased into closing relation with an opening provided in the handle 14, such pad being displaceable downwardly to uncover the opening and permit communication therethrough of the control passage 16 with atmosphere. Whenever the valve is closed a reduced pressure is established within the passages 16 and 11 because of the reduced pressure applied thereto via the coupling 17, and whenever the valve is open the passages 16 and 11 have a higher pressure therein approximating atmospheric. Details of a valve that can be used can be found in Hirt application Ser. No. 540,250, filed Apr. 5, 1966.

The longitudinally extending carriers 10 are spaced apart transversely and are maintained in spaced apart parallel relation by a support tube 19 welded or otherwise fixedly secured to each carrier as shown. The support tube 19 has a hollow interior defining a flow passage 20 extending from end to end thereof, and such passage is in open communication with each of the passages 11 provided within the respectively associated carriers 10. The open ends of the support tube 19 are closed by removable end caps or closures 21 and 22. Evidently, the passage 20 is effective to establish communication of each of the passages 11 within the carriers 10a, 10b, 10d and 10c with the passage within the carrier 10c and, therethrough, with the control passage 16 provided by the handle 14. Accordingly, whenever a vacuum or reduced pressure is established within the control passage 16, it is established contemporaneously within each of the carrier passages 11.

The various end caps 12, 13, 21 and 22 and the hand grip 15 may be formed of any suitable material as, for example, a natural or synthetic rubber composition or one of the well known synthetic thermosetting resin plastic materials such as polyethylene. Advantageously, all of such members are removable to facilitate cleaning of the apparatus, but this is not essential as respects the present invention.

Each carrier 10 is equipped with a plurality of vacuum cups 23 oriented therealong in longitudinally spaced relation and all disposed in axial alignment in the specific device illustrated. Each carrier 10 is provided with six vacuum cups 23 equally spaced therealong and extending downwardly therefrom. Accordingly, there are a total of thirty cups in the entire apparatus being considered. Each of the vacuum cups 23 is resilient and compressible axially toward the associated carrier 10, and the specific cup structure hereof comprises a resilient bellows having a plurality of accordion-type folds 24 formed therealong. Each cup 23 adjacent its lower end has a perimetric lip 25 adapted to be brought into engagement with an egg 26, which egg is indicated by broken lines in the drawing. Each cup 23 defines a vacuumizable chamber 27 within the interior thereof that communicates with the suction passage 11 in the associated carrier 10.

In this respect, each cup adjacent its upper end has a neck 28 provided with a bore or passage therethrough which receives a connector 29 in the form of a hollow screw having a passage 30 extending therethrough. At its lower end within the chamber 27, the connector 29 has a laterally enlarged head that bears upwardly against the lower surface of the neck 28, and its upper end the connector is threaded and is received within a correspondingly threaded opening provided therefor in the wall of the associated carrier 10. The head of the connector 29 may be slotted so as to receive a screw driver and upon tightening of the connector into the threaded opening therefor, the neck 28 of the cup is confined between the enlarged head of the connector and the surface of the carrier 10.

As shown most clearly in FIGURES 3 and 4, the accordion folds 24 define within the chamber 27 of the associated cup 23 a plurality of annular channels or internal pleats 31. In the cup structure 23 shown, there are three accordion-type folds 24 and, consequently, three annular channels 31 defined thereby within the chamber 27. The channels 31 are spaced apart axially along the cup 23, and located within one such channel (the central channel in the particular apparatus being considered) of each cup is a stamping device generally denoted with the numeral 32. More particularly in this respect, the stamping device 32 includes a marking element 33 and support structure 34 therefor. The support structure 34 constitutes a relatively flat disc or annulus that conforms in perimetric configuration to that of the channels 31 which, in the particular terms of the structure illustrated, is circular in each instance. Additionally, the disc 34 has substantially the same diameter as that of the channels 31 so as to seat therein, as shown in FIGURES 3 and 4; and to facilitate insertion and removal of the disc into and out of a channel 31, the outer circumferential edge portion 35 of the disc is relieved or rounded slightly, which relief is also effective to prevent damage to the soft cups 23 as the edge of a disc moves thereover.

The marking element 33 is centrally disposed with respect to the disc or support structure 34 and may project therethrough, as shown in FIGURES 3 and 4, so as to provide a marking surface 36 a spaced distance beneath the support structure 34. Such marking surface 36 contains a suitable legend which is adapted to be transferred or imprinted onto the surface of an article 26 engaged thereby. In the case of the articles 26 being eggs, the legend may designate, for example, the size, quality, or use intended therefor. For illustrative purposes, the marking surface 36 is shown in FIGURE 5 to contain the indicia or legend US (reversed on the marking element so as to read correctly when transferred to the surface of an egg).

The support structure 34 is provided with at least one opening therethrough so as to permit the pressure present on one side thereof to be provided along its opposite side. In the structure shown in FIGURE 5, four such openings 37 are provided and they are located radially outwardly from the marking element 33 and are spaced apart by equal angular distances. The precise number and size of the openings 37 will depend upon the size and capacity of the apparatus and of the cups 23 provided thereby.

The particular marking element 33 used herein is characterized by providing an internally-contained supply of ink sufficient to obviate completely any requirement for repetitive transfer to the marking surface 36 of ink from a stamp pad or other external reservoir. An exemplary reservoir-providing material or material that self-contains a marking fluid or ink and which may be used to form the marking element 33 is a material sold by S. C. Johnson and Company of Racine, Wisconsin, under the name of "Porelon." A marking element formed of such material has a significantly long life, and while the precise number of stamping operations which can be performed thereby will vary considerably in accordance with a variety of environmental conditions, tests have indicated that repetitive imprintings onto an egg shell of several thousand is attainable, and up to a million cycles can be anticipated. The marking fluid employed in such Porelon marking element is a glycol-base ink and is non-toxic. Further, such fluid has a very low volatility which enables the marking element to remain unused and uncovered for long periods of time without the surface thereof drying to an extent making the marking element ineffective. Further as concerns such marking fluid, drying thereof is effected largely by absorption of the fluid into the surface to which the stamp or mark is applied, which surface, in the case of eggs, is the shell thereof.

In use of the apparatus, and with the coupling 17 thereof first being connected to a source of reduced pressure, a workman grasps the apparatus by the hand grip 15 thereof and positions the various cups 23 in respective contact with a plurality of eggs supported in longitudinally and transversely aligned rows in a flat or other support structure. Upon the lip 25 of the various cups being brought into contact with eggs 26, a vacuum or reduced pressure is established within the passages 16, 20 and 11, and such vacuum is transferred through the connectors 29 of the cups 23 into the chambers 27 within the interiors thereof. Such vacuum causes the eggs 26 to be lifted upwardly toward the overlying carriers 10, whereupon the eggs are tightly gripped by the cups so that the workman may lift the entire apparatus together with the eggs clamped thereto to transfer such eggs to a different location. At such different location the eggs are released from the grip of the cups 23 by opening the valve 18 which, in the apparatus shown, results from depression of the valve. When the valve has been opened, the passages 16, 20 and 11 are in open communication with atmosphere and the resultant loss of reduced pressure within the chambers 27 of the cups 23 causes the eggs 26 to be released.

Comparison of FIGURES 3 and 4 indicates the relative position of each egg 26 with respect to the overlying stamping device 32 prior to the establishment of a vacuum or reduced pressure within the cup (FIGURE 3) and subsequent to such establishment (FIGURE 4). It is evident in FIGURE 4 that with a vacuum established within the cup, it is compressed axially toward the associated carrier 10, whereupon the accordion folds 24 tend to be brought into contiguous relation and the egg 26 engaged by the cup displaced into physical abutment with the marking surface 36 of the marking element 33. Such abutment therebetween is firm and effective to cause the marking surface to transfer a sufficient quantity of marking fluid onto the egg shell to form a legible stamp or impression thereon.

The force with which the egg 26 is moved into engagement with the marking element 33 is substantially the same in every instance irrespective of the particular cup 23 being considered and irrespective of the size of the egg 26 so long as the reduced pressure applied thereto is sufficient to bring the heaviest egg encountered into abutment with the marking element. More particularly, in considering the case of an exceptionally lightweight egg, such egg would tend to be displaced upwardly and into engagement with the overlying marking element 33 more quickly and perhaps to a greater extent than a heavier egg because there is less gravitational opposition in the case of the less heavy egg. However, the magnitude of the force of engagement or abutment force defined between such lightweight egg and the marking element will not significantly exceed the force of engagement defined between a heavier egg and a marking element associated therewith because the cup 23 associated with a lightweight egg will simply compress to a slightly greater extent under the action of the upwardly directed force thereon, whereupon the egg 26 engaged thereby and marking element 33 will be displaced concurrently toward the overlying carrier 10. Therefore, whether the egg 26 is heavy, lightweight or intermediate weight, substantially the same degree of engagement will be defined thereby with the marking surface 36 of the associated marking element 33. Thus, the impression or legend transferred to each egg is exceptionally legible in each case.

Since the stamping device 32 is simply confined within an associated cup 23 by having the peripheral edge of the support structure 34 seated within a fold 24, the stamping device 32 is readily removed from the cup and quickly and easily replaced whenever required, as for cleaning a cup should an egg crack and the contents thereof be sucked into the cup, or to interchange one stamping device with another when the fluid impression material is exhausted or the legend must be changed.

As suggested hereinbefore, the apparatus can be used with a considerable variety of articles, and is especially able to accommodate articles that may vary slightly in size and shape such as eggs, fruit (e.g., oranges), and vegetables (tomatoes). It may be noted that it is not essential that every cup 23 be in engagement with an article in order that the vacuum developed be sufficient to lift articles; and in this respect, the passages 30 are sufficiently small in cross section to restrict the inrush of atmospheric air therethrough and thereby permit development of an adequate vacuum should several of the cups be without articles.

The various tubes 10 and 19 define frame structure which provides a vacuumizable chamber defined by the passages 11 and 20 together with the control passage 16. Such chamber is in open communication with the hollow interiors of the various cups 23 through the passages 30. The cups, it should be appreciated, tend to resist compression to a progressively increasing extent in accordance with the degree of compression thereof in the manner of an ordinary Hooke's law type spring, which resistive compressive force of increasing magnitude limits the compressive displacement of a cup when engaged by a lightweight egg, as described heretofore.

As indicated hereinbefore, the invention is particularly useful in connection with devices adapted to lift and stamp a substantial number of eggs concurrently as, for example, 48 or more eggs, but it is also useful with devices having a much smaller capacity such as those intended to process 6 eggs concurrently. Where egg-engaging cups having accordion type folds are employed, it is convenient to utilize such folds as a mounting means for the stamping device 32, as explained heretofore. However, the stamping device can be otherwise mounted within the interior of the cup and another form of mounting means (e.g., direct connection to the neck 28 or connector 29) for the stamping device is necessarily employed where the resilient axially compressible cup does not have accordion type folds.

In certain instances, especially where the number of eggs being processed concurrently by the device is of restricted number, 6 to 12 for example, the device may be operated as a stamper without vacuum assistance in which event the operator simply depresses the device to compress the cups and bring the stamping devices 32 into engagement with the eggs aligned with the various cups.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. A stamping device for use in transferring an impression of predetermined character to an egg or like article, comprising support structure having an arcuate edge portion lying essentially along the circumference of a circle having its origin at the approximate center of the stamping device and which center thereof lies substantially along the longitudinal axis of any axially compressible and axially elongated article-engaging cup having a hollow interior receiving said stamping device therein, said support structure being provided with at least one opening accommodating the flow of fluid therethrough to enable the pressure within such cup to be substantially the same on each side of the stamping device and a marking element carried by said support structure and being equipped with impression-forming indicia along a face thereof for engagement with such article to transfer an impression thereto, said marking element having interiorly a supply of marking fluid adequate to accommodate a substantial number of impression transfers before depletion of such supply.

2. The stamping device of claim 1 in which said support structure comprises an annular disc having a substantially continuous edge portion, said edge portion being relieved in cross section to facilitate insertion and removal of said stamping device into and from such cup.

3. The stamping device of claim 1 and in combination therewith an axially elongated article-engaging hollow cup open at one end so as to seat upon such article, said cup being provided with a plurality of accordion-type folds and being axially compressible to reduce the normal space in the axial direction between said folds, said stamping device being mounted within the hollow interior of said cup so as to engage an article upon which said cup is seated when the cup is axially compressed so as to transfer an impression to such article.

4. The combination of claim 3 in which said folds provide within the hollow interior in said cup at least one annular channel, said edge portion being relieved in cross section to facilitate insertion and removal of said stamping device into and from such channel.

5. Apparatus of the character described for use with eggs and like articles, comprising frame structure equipped with a plurality of axially compressible article-engaging cups each of which is provided with a hollow interior and terminates at one end in a perimetric lip adapted to engage such article, a plurality of stamping devices respectively mounted within the interiors of said cups, each of said stamping devices being equipped with a marking element to transfer an impression of predetermined character to an article engaged by the associated cup and displaced into engagement with the stamping device upon compression of the cup, said frame structure having a vacuumizable chamber connected with the hollow interiors of said cups so as to establish therewithin a reduced pressure sufficient to cause each cup to clamp thereto an article engaged thereby and to compress axially as a function of such clamping, and valve structure for selectively establishing a reduced pressure within said vacuumizable chamber and cups connected therewith, each of said cups being provided with a plurality of accordion-type folds compressible toward contiguous juxtaposition upon axial compression of the cup, each of said stamping devices being provided with support structure having portions thereof confined within such folds in the hollow interior of the associated cup to maintain the stamping device therewithin.

6. The apparatus of claim 5 in which said support structure comprises an annular disc having a circumferential edge portion thereof seated within one such fold of the associated cup, said disc being provided with at least one opening therein for accommodating the flow of fluid therethrough.

7. The apparatus of claim 6 in which said circumferential edge portion of said disc is arcuate in cross section.

8. The apparatus of claim 6 in which said marking element is centrally located with respect to said disc and is adapted to firmly engage an article clamped to the associated cup upon axial compression thereof.

9. The apparatus of claim 6 in which said marking element is provided interiorly with a supply of marking fluid adequate to accommodate a substantial number of impression transfers before depletion of such supply.

10. The apparatus of claim 6 in which said article-engaging cups are arranged in a plurality of longitudinally extending rows and also a plurality of transversely extending rows, said cups in each row thereof being spaced apart and having their axes lying within essentially the same plane.

11. The apparatus of claim 6 in which said frame structure comprises a plurality of elongated transversely extending carrier tubes each having a passage extending therethrough, said frame structure further comprising a transversely extending tube having a passage extending therethrough and being fixedly secured to each of the aforesaid carrier tubes with its passage in flow communication with the passage therein, and a handle fixedly secured to one of said tubes and having a control passage therein in open communication with the passage in such one tube, said valve structure being hand manipulatable and located along said handle to control the pressure within said control passage, said cups being arranged in spaced-apart relation along each of said carrier tubes.

References Cited

UNITED STATES PATENTS

| 1,779,174 | 10/1930 | Larsen | 101—35 XR |
| 3,230,001 | 1/1966 | Hirt | 294—64 |

ROBERT E. PULFREY, *Primary Examiner.*

H. DINITZ, *Assistant Examiner.*